United States Patent [19] [11] 4,231,794
Moranne [45] Nov. 4, 1980

[54] LEAD BASED ALLOY FOR THE BONDING OF ALUMINUM PARTS TO PARTS COMPRISING AN ALLOY OF A HEAVY METAL

[75] Inventor: Jean-Pierre Moranne, Franconville, France

[73] Assignee: Societe Anonyme des Usines Chausson, Asnieres, France

[21] Appl. No.: 29,862

[22] Filed: Apr. 13, 1979

[30] Foreign Application Priority Data

Apr. 20, 1978 [FR] France ................................ 78 11759

[51] Int. Cl.³ ............................................. B23K 35/26
[52] U.S. Cl. .................................... 75/166 C; 428/643
[58] Field of Search ....................... 75/166 C; 428/643

[56] References Cited

U.S. PATENT DOCUMENTS

| 2,303,194 | 11/1942 | Bouton et al. | 75/166 |
| 3,969,110 | 7/1976 | Plegat | 75/166 C |
| 4,032,059 | 6/1977 | Plegat | 228/183 |

OTHER PUBLICATIONS

Hoffmann, W., Lead and Lead Alloys, Springer-Verlag, N.Y., 1970, pp. 137–141, 417.

*Primary Examiner*—L. Dewayne Rutledge
*Assistant Examiner*—Upendra Roy
*Attorney, Agent, or Firm*—Browdy and Neimark

[57] ABSTRACT

In a lead soldering alloy for soldering parts of which one at least is made of an aluminum containing alloy and the other of heavy metal, the antimony content of the alloy is reduced so as to be between 0.2 and 1% by weight.

3 Claims, No Drawings

LEAD BASED ALLOY FOR THE BONDING OF ALUMINUM PARTS TO PARTS COMPRISING AN ALLOY OF A HEAVY METAL

The present invention relates to improvements concerning a lead based soldering alloy for the soldering or soft brazing of parts, at least one of which being made of an aluminum containing alloy, and another of a heavy metal such as copper, brass, stainless steel and similar. U.S. Pat. No. 3,969,110 has already disclosed an alloy containing at least:

65 to 85% by weight of lead;
12 to 30% by weight of cadmium;
1 to 6% by weight of antimony;
0.5 to 1% by weight of tin.

The improvements according to the present invention have for their purpose to improve the wetting effect of the brazing alloy described in U.S. Pat. No. 3,969,110 on metals to be brazed, without substantially reducing the resistance to corrosion of the brazing so made.

According to the invention, the soldering alloy in the base of lead for the soldering or soft brazing of parts is characterized in that the quantity of antimony is reduced to be comprised between 0.2 and 1% by weight.

Further other features of the invention will become more apparent from the following detailed description.

The present invention relates to a soldering alloy, or more precisely to an alloy for a soft brazing, for soldering composite metal parts, at least one of which being made of an aluminum containing alloy and the other being in heavy metal or alloy, viz. a copper or iron containing metal.

The brazing operation is carried out by using the alloy of the invention in the presence of a flux of the type of those used for the soft brazing of aluminum, that is preferably a flux which is little aggresive such as an organic flux which does not contain chloride. Appropriate fluxes are those containing zinc fluoborate, diethylenetriamine and triethanolamine or diethanolamine.

The composition of alloys according to the present invention essentially contains lead, cadmium, tin and a very small quantity of antimony. For instance, the alloy of the invention contains:

from 70 to 90% by weight of lead;
from 10 to 30% by weight of cadmium;
from 0.5 to 2% by weight of tin;
and only
from 0.2 to 1% by weight of antimony.

As a matter of fact, it has been considered as advantageous according to the present invention to increase the tin content in order to improve the wetting effect of the brazing alloy on the metals to be brazed and to reduce the quantity of antimony for improving this effect without substantially reducing the resistance to corrosion of the alloy.

Further additives may be used, particularly bismuth in a proportion of 0.5 to 5% and silver in a proportion of 0.2 to 1% as well as zinc in a proportion of 0.2 to 1%, these two latter metals facilitating still more the wetting on the aluminum while increasing the mechanical resistance of the soldering alloy, but their use is, according to the invention, limited to the case where the brazing mixtures have to exhibit a quite particular mechanical resistance, due to the price of such metals.

Preferably, a composition of the alloy according to the invention comprises:

lead 81% by weight;
cadmium 17% by weight;
antimony 0.2 to 1% by weight;
tin 0.5 to 2% by weight.

The invention is not limited to the embodiment described in detail since many modifications may be carried out without departing from its scope as shown in the appendant claims.

I claim:

1. Soldering alloy having a lead base for the soldering or soft brazing of parts of which at least one part is made of aluminum or aluminum alloy and another part is made of an alloy of heavy metal selected from copper, brass, stainless steel and the like, comprising:

70 to 90% lead by weight
10 to 30% cadmium by weight
0.5 to 2% tin by weight and
between 0.2 and 1% antimony by weight.

2. Alloy as set forth in claim 1, further containing additives selected from the group consisting of:

bismuth: 0.5 to 5% by weight,
zinc: 0.2 to 1% by weight, and
silver: 0.2 to 1% by weight.

3. Alloy as set forth in claim 1, consisting essentially of:

lead: 81% by weight
cadmium: 17% by weight
antimony: between 0.2 and 1% by weight, and
tin: 0.5–2% by weight.

* * * * *